Feb. 14, 1956  H. J. BROW  2,734,697
AIRPLANE RESCUE TOWING SYSTEM
Filed June 18, 1952  2 Sheets-Sheet 1
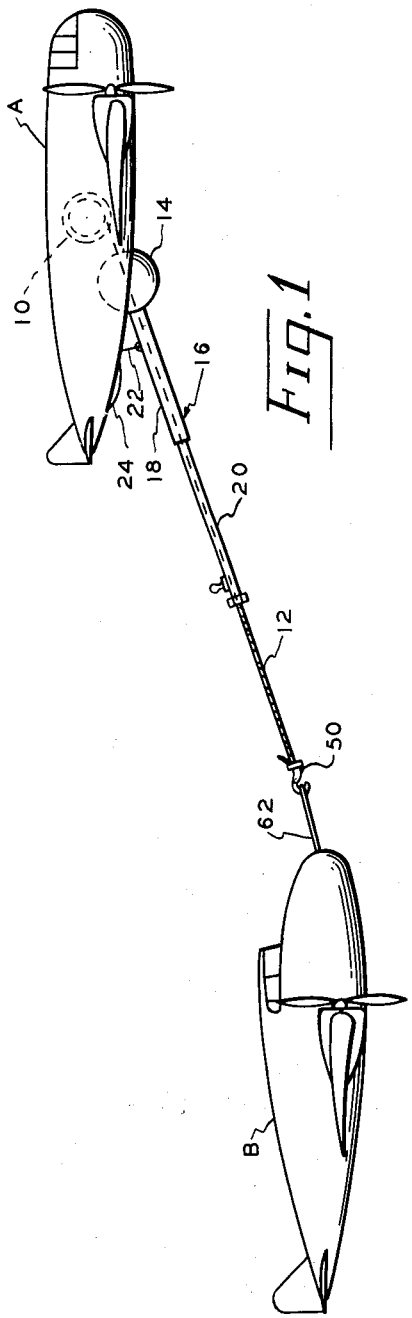
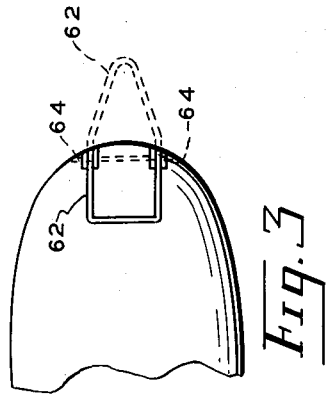
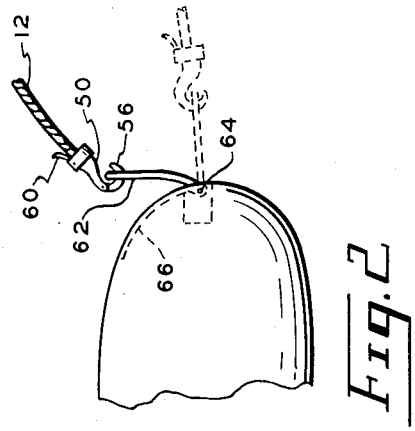
INVENTOR
HAROLD JAMES BROW
BY *Gustave Miller*
ATTORNEY Feb. 14, 1956 H. J. BROW 2,734,697
AIRPLANE RESCUE TOWING SYSTEM
Filed June 18, 1952 2 Sheets-Sheet 2
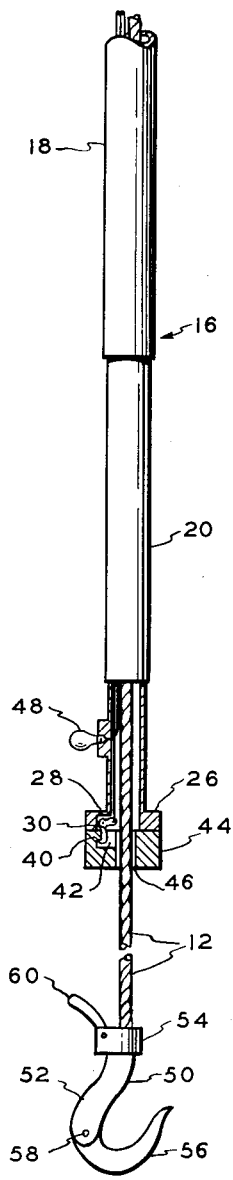
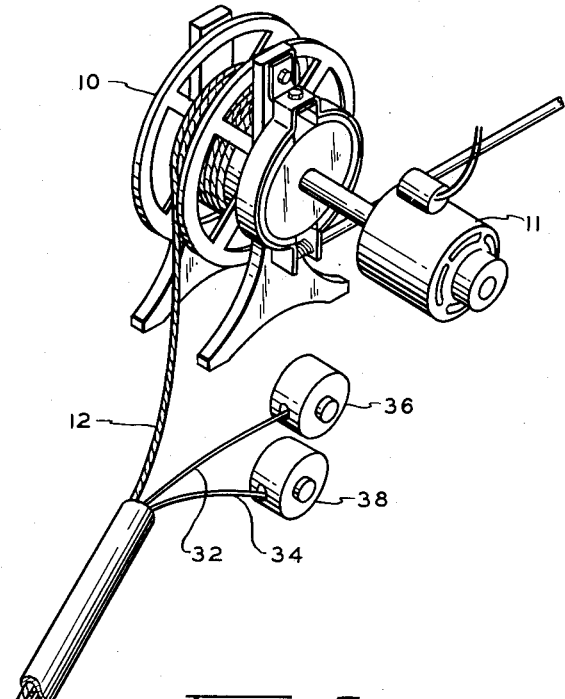
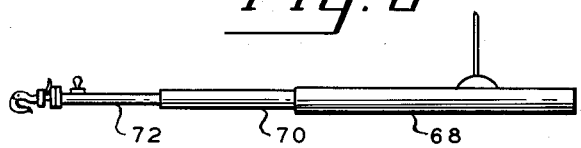
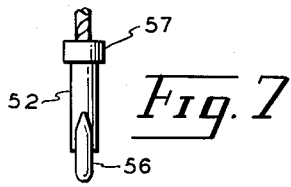
INVENTOR
HAROLD JAMES BROW
BY *Gustave Miller*
ATTORNEY

United States Patent Office 2,734,697
Patented Feb. 14, 1956

2,734,697

AIRPLANE RESCUE TOWING SYSTEM

Harold J. Brow, Warrington, Fla.

Application June 18, 1952, Serial No. 294,115

4 Claims. (Cl. 244—3)

This invention relates to a towing system and particularly to a towing system whereby a rescue aircraft equipped with a towing device may take in tow a partially disabled aircraft while in flight and tow it to the vicinity of an airport or other suitable area where it can be released to effect a safe landing.

In using the system of this invention, it is contemplated that certain aircraft be equipped with the means to enable them to be taken in tow by the rescue aircraft. The use of this invention is, therefore, at present, limited to cooperating aircraft of a closed system, such as an airline, which would maintain rescue aircraft in a condition of readiness at certain terminals adjacent to hazardous areas of air traffic, or on coast lines for overseas traffic, and which, on the other hand, would equip all its regular aircraft, or at least those flying over the hazardous areas, with the means to enable them to be taken in tow. It may be also used by the Navy for those planes which do most of their flying over water. In such a case, an aircraft carrier or certain islands in the area of operations may be provided with rescue aircraft.

Although, as stated above, the invention is, at present, limited to such closed systems as an airline or the military or naval services where a unified operational control is maintained over all the aircraft so that all may be properly equipped, it is within the realm of possibility that all aircraft, both military and privately owned, be required to carry the means to enable them to be taken in tow, and that rescue aircraft be maintained adjacent hazardous areas by either the state or federal government.

It is also possible that all planes, either in a closed system or in general, be provided with both the towing device and with the means for enabling the plane to be towed. In that way, any plane may serve either as a rescue plane or, if incapacited, as a towed aircraft.

One object of this invention, therefore, is to provide an improved air-to-air towing device for disabled aircraft.

Another object of this invention is to provide a relatively simple towing device which may be readily incorporated on most aircraft.

Another object of this invention is to provide a relatively simple means for enabling an aircraft to be towed, such means being adapted to be used on virtually any aircraft.

Other objects of this invention are to provide an improved device of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a view showing the towing means in use between two aircraft.

Fig. 2 is a side elevational view showing the gripping parts of the towing means in enlarged detail.

Fig. 3 is a top plan view showing the structure of the tow hook receiving means.

Fig. 4 is a view partly in elevation and partly in section showing the tow-bar or cable housing and its associated parts.

Fig. 5 is an enlarged detail view of the cable reel and its associated parts.

Fig. 6 is a view similar to Fig. 4 but showing a modification of the tow-bar shown in Fig. 4.

Fig. 7 is a front view of the towing hook.

Referring now in greater detail to the drawing wherein similar reference characters refer to similar parts, there is shown in Fig. 1 a rescue or tow plane A provided with a reel 10 actuated by a motor 11 for holding a cable 12. The cable 12 extends through a universal ball joint 14 on the underside of the airplane A. A tow-bar or cable housing 16 extends outwardly from the ball joint 14 and the cable 12 passes through this tow-bar. The tow-bar 16 comprises a pair of telescoping members 18 and 20, the member 20 being adapted to slide within the member 18 so that the tow-bar may be telescoped into a compact unit when not in use. When the members 18 and 20 are in completely telescoped position, the tow-bar is adapted to be pivoted by ball 14 against the underside of the plane so as to prevent excessive drag. A control cable 22 is used to pull the tow-bar against the underside of the plane, this control cable being, in turn, controlled by a winch, not shown.

A transparent bubble 24 is provided on the underside of the tow plane adjacent its rear portion. The operator of the towing device sits in this bubble and is, thereby, in a position to observe and to control the towing operation.

The tow-bar 16, as illustrated in Fig. 4, comprises the wide or outer telescoping tubular member 18 and the inner tubular member 20. At its outer end, the member 20 is provided with a flange 26. A recess 28 is provided in the flange 26 and in this recess is pivotally positioned a catch 30. This catch is controlled by a pair of wires 32 and 34, each of which is connected to an individual pulley as at 36 and 38. The pulleys 36 and 38 are controlled either manually, mechanically or electrically by appropriate means, not shown. The catch 30 is adapted to hook over a shoulder 40 formed by a recess 42 in an actuating weight member 44. The weight 44 has a central bore 46 to allow the cable 12 to pass therethrough. An electric light bulb 48 is provided on the member 20 adjacent the flange 26. This light bulb is for the purpose of lighting the area around the end of the tow-line to enable the operator to observe the hooking and towing operations at night.

At the free end of the tow cable 12 is provided a connecting member 50 comprising an outer hollow member 52 having a flange 54 and a hook member 56 which extends partially within the member 52 and is internally pivoted thereto, as at 58. A trigger 60 acts to rock the pivoted hook 56 from operational to non-operational position when actuated. The hook is biased toward its operational or holding position shown in Figs. 1, 2 and 4, by spring means, not shown, since it is conventional and forms, by itself, no part of this invention. When it is desired, to release the hook 56 from its operational position, the weight 44 is allowed to drop down along the cable 12 until it strikes the trigger 60. The trigger is, thereby, forced down and releases the hook, allowing it to swing to the left, as viewed in Fig. 4, toward its release position. The flange 54 prevents any further travel of the weight 44. The weight is released by actuating the wires 32 and 34 to pivot the catch 30 to its release position.

The hook 56 is adapted to engage a towing loop 62 which is constructed of flexible steel wire covered with soft aluminum alloy tubing to hold it in its generally U-shaped form as shown in full line in Fig. 3. This loop 62 is pivoted to the nose portion of the plane B as at 64, and is adapted to lie within a groove or recess 66 in the nose portion of the plane B when not in use. This is to prevent drag.

When loop 62 is to be engaged by the hook 56 it is pulled out of the groove 66 into a position such as shown in full line or in dotted outline in Fig. 2. The force of plane A exerted through the cable 12 and connecting member 50 acts to stretch the loop 62 into approximately the V-shape shown in dotted outline in Fig. 3.

Fig. 6 shows a modification of the tow-bar shown in Fig. 4. In this modification, there is illustrated a bar made of three telescoping members 68, 70 and 72. The remaining structure is the same. If desired, any number of telescoping parts may be used.

Although this invention has been described in considerable detail, such description is intended as being illustrative rather than limiting, since the invention may be variously embodied, and the scope of the invention is to be determined as claimed.

What is claimed as the invention is:

1. An aircraft rescue towing system comprising a winch at one end of said system and a loop on the other end, said winch being mounted on a first movable support and said loop being adapted to be mounted on a second movable support, a flexible cable connected to said winch, a universal joint on said first support, said joint being provided with an extensible housing extending outwardly therefrom, said housing having a free end, said cable extending through said joint and through said housing, a flange on said free end of the housing, a weight releasably connected to said housing and encircling said cable, a pivoted hook connected to the free end of said cable, a trigger connected to said hook and being adapted to effect a rocking movement of said hook around its pivot, upon said triggers being contacted by said weight, said hook being in a position to engage said loop, when the weight is held spaced from said trigger.

2. The system of claim 1 wherein the free end of said housing is adapted to be moved into abutting relationship with said first support.

3. The system of claim 1 wherein said loop is pivotally mounted on said second support and is adapted to enter a recess in said second support.

4. The system of claim 1 wherein said weight is releasably held against said housing by a pivoted catch, said catch being actuatable for movement around its pivot by control means extending through said housing to said first support, and means on said first support to actuate said control means.

References Cited in the file of this patent

UNITED STATES PATENTS

| | | |
|---|---|---|
| 1,418,783 | Fokker | June 6, 1922 |
| 1,477,836 | McGowan | Dec. 18, 1923 |
| 2,076,476 | Mores | Apr. 6, 1937 |
| 2,276,312 | Jurschick | Mar. 17, 1942 |
| 2,396,071 | Anderson | Mar. 5, 1946 |
| 2,418,702 | Du Pont | Apr. 8, 1947 |
| 2,433,473 | Mitchell | Dec. 30, 1947 |
| 2,480,145 | Lazarus | Aug. 30, 1949 |
| 2,481,280 | Beddow | Sept. 6, 1949 |
| 2,634,924 | Brown | Apr. 14, 1953 |
| 2,639,107 | Brown | May 19, 1953 |

FOREIGN PATENTS

| | | |
|---|---|---|
| 98,871 | Switzerland | Apr. 16, 1923 |
| 166,552 | Austria | Aug. 25, 1950 |